June 11, 1957  O. J. BORROWDALE  2,795,316
ELEVATOR-CONVEYOR HAVING RADIALLY MOVABLE BAFFLING BLADES
Filed May 11, 1953  3 Sheets-Sheet 1
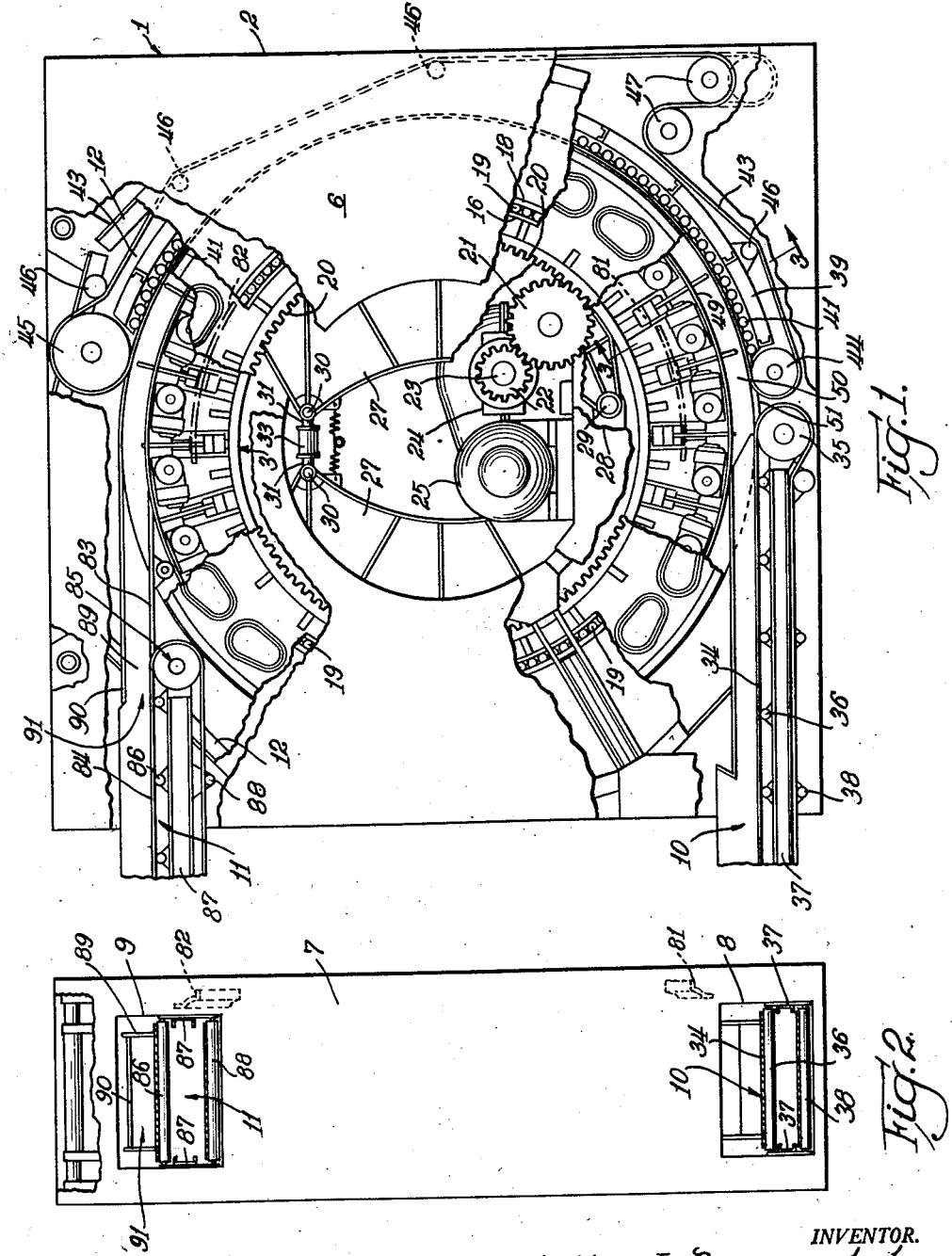
INVENTOR.
Orville J. Borrowdale INVENTOR.
Orville J. Borrowdale
BY
Gary Desmond & Parker
attys.

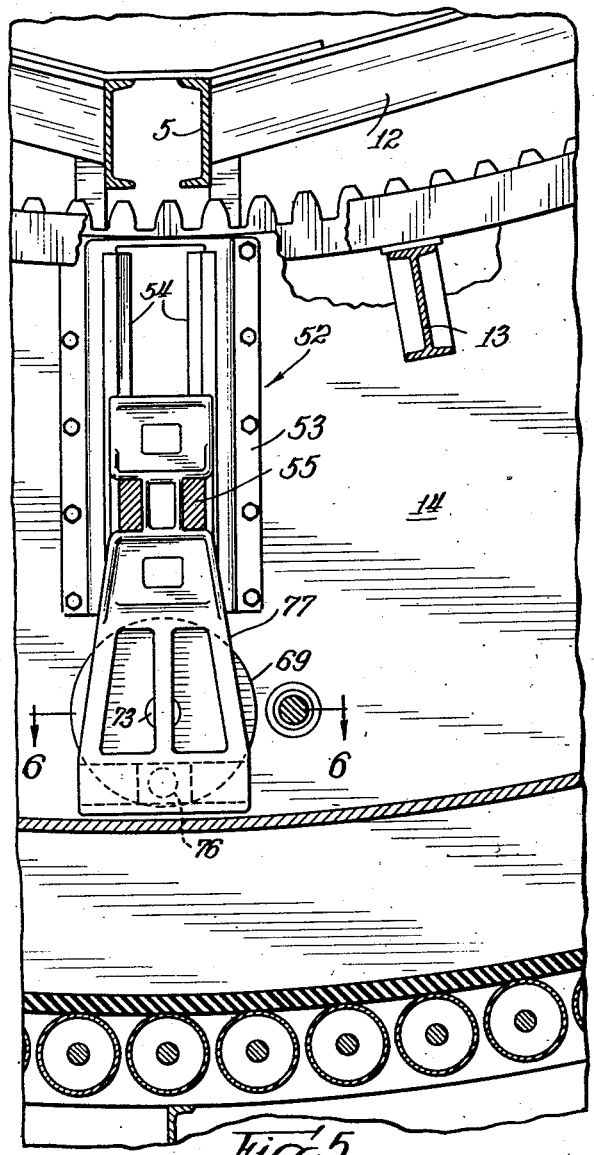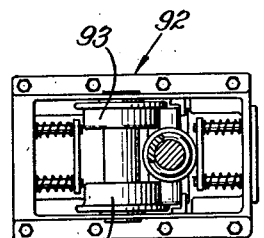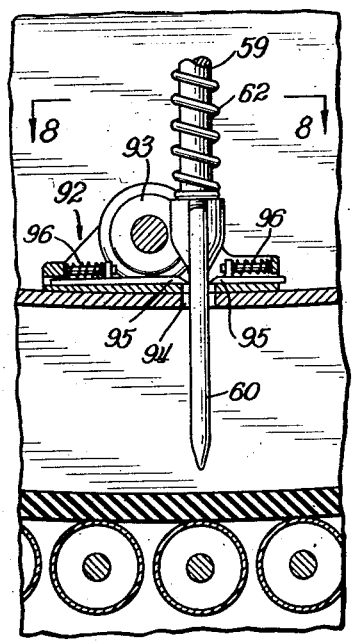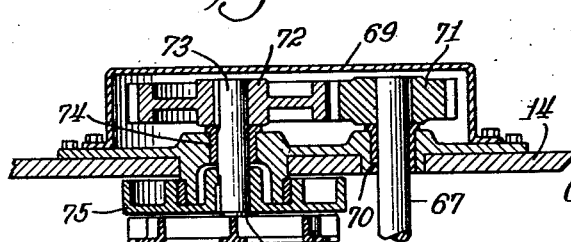

United States Patent Office 2,795,316
Patented June 11, 1957

2,795,316

ELEVATOR-CONVEYOR HAVING RADIALLY MOVABLE BAFFLING BLADES

Orville J. Borrowdale, Chicago, Ill.

Application May 11, 1953, Serial No. 353,935

10 Claims. (Cl. 198—167)

This invention relates to improvements in an elevator-conveyor, that is, a mechanism for lifting or elevating material from a lower level to an upper level as a step in the conveying of such materials.

The present invention comprises a device which may, in effect, comprise a link in a conveyor system, wherein the material carried by the conveyor system is continuously raised from a lower level to an upper level, the device being characterized in that the effective lift of the material is relatively great compared to the distance traveled by the material.

Hoists or inclined conveyors have heretofore been proposed for raising material from a lower level to an upper level, but in substantially all cases where the material is lifted abruptly, as by means of usual bucket hoists, the operation is slow and the equipment is expensive, and where inclined conveyors are employed, the rate of lift relative to the linear travel of the conveyor belt is relatively low negativing the use of such conveyors where the situs of the material being lifted provides only limited space.

As a feature of the present invention a device is contemplated for raising material wherein the rate of rise per unit volume of material carried is high, that is, the capacity is relatively great and wherein the space or distance through which the material is carried is small whereby the device is ideally adaptable to handle materials which are confined in more or less cramped spaces. In addition, the cost of the device and power expended in operating it is relatively low per unit of volume raised per unit of effective lift.

A further feature of the present invention resides in the provision of blade, baffle or partition means or other projecting members which are movable into and out of the material to be elevated during the period of elevating the same to prevent undue slippage of the material, the blade, baffle or partition means or other projecting members being inserted into the material at the commencement of its lift and being withdrawn from the material after the lifting has been completed.

Another feature of the present invention resides in the provision of blade, baffle, partition means or other projecting members which are movable radially into and out of the compartment into which the material is elevated.

Other objects and advantages of the present invention will be apparent from the accompanying drawings and following detailed description.

In the drawings,

Fig. 1 is a side elevational view, parts being broken away, of the improved elevator-conveyor.

Fig. 2 is a front elevational view of the device shown in Fig. 1.

Fig. 5 is an enlarged detailed sectional view taken on line 5—5 of Fig. 3.

Fig. 6 is a detailed sectional view taken on line 6—6 of Fig. 5.

Fig. 7 is an enlarged detailed sectional view taken on line 7—7 of Fig. 3.

Fig. 8 is a sectional view taken on line 8—8 of Fig. 7.

Figure 4:
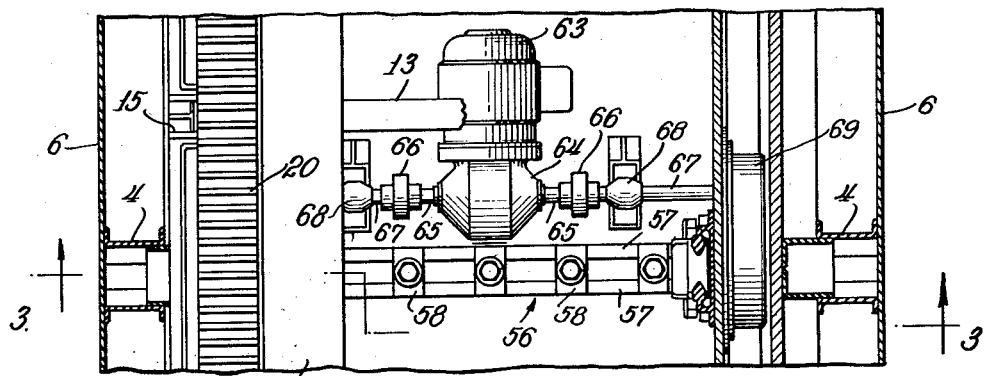
Fig. 4 is a sectional view taken on line 4—4 of Fig. 3.

Referring in detail to the drawings, 1 indicates generally an elevator-conveyor comprising an embodiment of the present invention. The elevator-conveyor 1 comprises essentially a stationary frame structure 2 and a rotating frame structure 3, the latter being rotatably mounted upon the former. The stationary frame structure comprises upright columns 4 and transverse beams 5, said structural members carrying wall panels 6 which cover opposite sides of the stationary frame and end wall panels 7 which cover the ends of the stationary frame structure.

One end wall panel 7 is provided with openings 8 and 9 at the lower and upper portions of the wall for the reception, respectively, of a feed conveyor 10 and a discharge conveyor 11. Material to be elevated by the device 1 is fed into the lower portion of the device upon conveyor 10 and is discharged from the device, at a higher elevation, to a desired location.

The stationary frame structure 2 also includes an opposite series of structural members 12 which are disposed polygonally to define, roughly, the path of travel of the rotating frame structure 3.

The rotating frame structure 3 comprises a plurality of circumferentially spaced beams 13 which carry adjacent their opposite ends annular wall panels 14. The ends 15 of each of the beams 13 extend outwardly from the panels 14 and carry an annular, inner race 16. Carried within the outer walls 6 of the stationary frame structure are opposite annular walls 17, which, in turn, adjacent their inner edges carry an outer race 18. Between inner races 16 and outer races 18, rollers 19 are positioned whereby the rotating frame structure 3 may rotate freely within the stationary frame structure 2.

A pair of ring gears 20 are carried upon the extending ends 15 of the transverse beams 13 of the rotatable frame structure, there being one gear on each side of the rotatable frame with the inner portion of each of the gears carrying teeth. A driving gear 21 meshes with each of the ring gears 20 and each driving gear in turn meshes with a gear 22 carried at the opposite ends of shaft 23. Shaft 23 is the output shaft of a gear reducing mechanism 24, the input shaft of which is coupled to the shaft of electric motor 25. The arrangement is such that when motor 25 is actuated the driving gears 21 function to drive the ring gears 20 whereby the rotatable frame structure 3 is rotated upon the bearings 19.

Adjacent both of the ring gears 20 are brake drums 26, there being one drum adjacent each ring gear. Two pair of brake shoes 27 are adapted to cooperate with the brake drums 26, there being one pair of brake shoes disposed in braking relationship to each brake drum 26. The brake shoes 27 are pivotally mounted upon a portion 28 of the stationary frame structure 2 as shown best at 29 in Fig. 1. The end of only one brake shoe is shown. The opposite end portions of the brake shoes 27 of each pair are pivotally connected as at 30 in Fig. 1 to hydraulically operated piston rods 31 which operate in a hydraulic cylinder 33. The arrangement is such that when it is desired to retard or stop the rotation of the rotatable frame structure 3, fluid under pressure is introduced to each cylinder 33 whereby the brake shoes 27 are applied under pressure to the brake drums 26.

As has been hereinbefore described, a feed conveyor 10 extends through opening 8 in the lower portion of wall 7 of the stationary frame 2. The conveyor 10 comprises an endless belt 34 which is trained around spaced end rolls 35, only one of which is shown. The opposite end roll may be disposed remote from the device 1 whereby the remote end portion of the feed conveyor may be positioned adjacent the mass of material to be conveyed and elevated. Separate means (not shown) may be employed to drive the conveyor 10, said conveyor periphery being driven at a rectilinear speed substantially equal to the peripheral speed of the rotating frame 3. The belt 34 may be supported, at its upper pass, upon rolls 36 which, in turn, may be mounted upon opposite frame members 37. Guide rolls 38 may guide the belt 34 at its lower pass, said guide rolls also being supported upon the frame members 37.

A pair of laterally spaced arcuate frame members 39 may be mounted upon the annular walls 17 of the stationary frame 2, transverse channel irons 40 being positioned between the opposite frame members 39. The frame members 39 are positioned outwardly from the periphery of the rotating frame 3 and traverse a major portion of the upward travel of the rotating frame. A plurality of rollers 41 are journaled in brackets 42 which are carried by the opposite frame members 39, the rollers 41 being disposed relatively close to each other and the series of rollers thus mounted describe an arcuate path which conforms to the periphery of the rotating frame 3.

An endless belt 43 is trained around end rolls 44 and 45 which are mounted upon the stationary frame 2. As will be hereinafter more fully described the belt 43 moves over the surfaces of the rollers 41 and said belt describes and arcuate path conforming to the curvature of the rotating frame 3. The belt 43 on its return travel passes over guide rolls 46 and also passes around belt tightening rolls 47 whereby the belt 43 may be maintained taut.

The spaced annular walls 14 of the rotating frame 3 carry at their outer ends annular flanges 48, said annular flanges being disposed adjacent the surfaces of rolls 41. In operation the belt 43 during its arcuate travel in conformity with the periphery of the rotating frame 3 is confined between the flanges 48 and the surfaces of roll 41. The arrangement is such that when the rotating frame 3 is rotated, the belt 43 being carried upon the surfaces of the flanges 48 is rotated in timed relationship with the rotation of the rotating frame. Thus, belt 43 moves in timed relationship to the rotating periphery of the rotating frame 3.

The rotating frame 3 carries a circular wall 49 which extends between the opposite spaced annular walls 14, the circular wall 49 providing a substantially cylindrical surface which is spaced, during a major portion of the upward travel of the rotating frame from the surface of belt 43 whereby a compartment 50 is provided between the drum wall 49 and belt 43. In operation, material to be conveyed and elevated is carried toward the device, upon the upper pass of the conveyor 10. Between the end roll 35 of the conveyor 10 and the end roll 44 which carries belt 43 a bridge member 51 is positioned. Hence, the material carried upon the upper pass of the belt 34 is delivered to the bridge 51 and is moved over said bridge onto the upper surface of the belt 43 into the space 50. In view of the fact that the belt 43 moves in step with the rotation of the frame 3 the material delivered to said belt moves outwardly from the bridge 51 upon the surface of the belt 43. It can readily be seen that after the material has been so delivered to the belt 43 the angle of inclination of said belt increases and hence there is a possibility of the material sliding backwardly as the belt 43 progresses in its arcuate travel upwardly.

As will be hereinafter more fully described, means is contemplated for preventing this retrogressive motion of the material carried upon the surface of the belt 43.

Each of the annular walls 14 carry on their inner surfaces a plurality of spaced guides 52, each of said guides comprising supporting flanges 53 which carry guide blades 54 which are spaced from each other. The guide blades are disposed radially with respect to the rotating frame 3 and said guides 52 are disposed in pairs upon the opposite walls 14, each guide 52 of each pair being opposite a similar guide. A sliding block 55 is disposed between each pair of guide blades 54 whereby said block is mounted for radial movement upon the guides 54. A cross-head bar 56 is secured at each of its ends to opposite blocks 55 and hence when the blocks 55 are moved within the guide blades 54 the cross head 56 moves radially inwardly and outwardly with respect to the rotating frame 3.

Each cross head 56 comprises a pair of spaced bars 57 and supporting plates 58 are disposed in bridging relationship with respect to the bars 57 in spaced relationship along the length of said bars. A blade shank 59 is loosely positioned in each of the supporting plates 58, each blade shank terminating at its end in a relatively flat blade 60. An abutment plate 61 is carried upon the lower faces of the bars 57 immediately beneath the supporting plates 58, each shank 59 passing loosely through one of the abutment plates 61. A coil spring 62 embraces each blade shank 59 and bears at its opposite ends upon an abutment plate 61 and the upper portion of blade 60. The arrangement is such that when the bars 57 are moved as a result of the movement of blocks 55 in the guide blades 54, the shanks 59 and blades 60, move with said bars. However, inasmuch as the shanks 59 and blades 60 are resiliently mounted with respect to the bars 57 movement of the shanks and blades with respect to the bars may take place in the event that the blades encounter a predetermined resistance during their movement, as will be hereinafter more fully described. An electric motor 63 is positioned upon the rotating frame 3 in association with each set of blades 60 which are carried by the bars 57. The motor 63 is connected mechanically to a speed reducing mechanism 64 of conventional construction, said speed reducing mechanism having opposite output shafts 65. Each of the shafts 65 are joined by couplings 66 to drive shafts 67 which latter are journaled in bearings 68 carried by the rotating frame.

A housing 69 is carried upon the outer surface of each of the annular walls 14 and each shaft 67 extending from the speed reducer 64 enters each housing 69. Referring particularly to Fig. 6 it will be seen that shaft 67 is journaled in a bearing 70 carried in the annular wall 14. Within the housing 69, shaft 67 carries a gear 71 which meshes with a companion gear 72 carried upon stub shaft 73. The stub shaft 73 is journaled in a bearing 74 carried through wall 14. On the opposite side of wall 14 from the housing 69 a disc 75 is mounted upon the stub shaft 73. The disc 75 carries an eccentric pin 76 which is pivotally connected to a connecting casting 77 which may be rigidly or integrally formed with block 55.

The arrangement is such that when the motor 63 is energized and the opposite shafts 67 are rotated, the discs 69 which are secured to the opposite blocks 55 are rotated and hence by virtue of the pin connection between the discs 75 and the casting 77, the blocks 55 are reciprocated within the guide blades 55. As has been hereinbefore described, reciprocation of the blocks 55 results in reciprocating movement of the bars 57 and hence reciprocating movement of the blades 60.

In employing the blades 60, it will be noted that said blades extend through the drum wall 49 into the space 50 between said wall and belt 43. The arrangement is such that when the material to be elevated and conveyed is transferred from belt 34 to belt 43 into space 50, the blades are initially in retracted position. However, shortly after each set of blades 60 passes the lowermost position of travel with the rotating frame 3, said blades move radially outwardly into the space 50 and, after a predetermined degree of movement, said blades remain stationary until they substantially reach their uppermost position of travel with the rotating frame, at which time they are retracted.

In order to accomplish the operation hereinbefore described each motor 63 is associated with a limit switch 78 which in turn is connected through a reversing circuit, shown diagrammatically at 80, to a source of electric power (not shown). The arrangement is such that when switch 78 is depressed or closed, motor 63 is energized and rotates in a predetermined direction, that is, the direction which causes blades 60 to move outwardly into space 50. To so depress or close switches 78, a cam bar 81 is positioned on the stationary frame 2 adjacent roll 35, the cam bar 81 being disposed in the path of travel of switches 78. The arcuate length of the cam bar 81 is such that each motor 63 is energized only long enough to cause blades 60 to project the desired distance into space 50.

Thus, shortly after the material to be conveyed is transferred to the belt 43, the blades move outwardly into space 50 and, if the material conveyed is of a discrete nature, said blades penetrate said material. After complete penetration of the material the blades remain stationary and function as baffles or partitions tending to prevent retrogressive movement of the material as the belt 43 continues its upward travel. Thus, the material is more or less abruptly elevated without due retrogressive movement or slippage.

At substantially the upper portion of travel of the material in the space 50, the blades 60 are retracted from the space 50. To accomplish this function, a cam rail 82 is carried by the stationary frame 2 in the path of travel of the switches 78 adjacent roll 45. As the rotating frame 3 moves, the switches 78 are sequentially closed and each motor moving past the cam rail is energized in such direction as to retract the blades 60. The material being conveyed, during retraction of the blades is essentially carried by the drum surface 49 and is thence transferred to a bridge 83 which is mounted upon the stationary frame.

The discharge conveyor 11 comprises an endless belt 84 which is trained around end rolls 85, only one of which is shown. The upper pass of the belt 84 is supported by rolls 86 which, in turn, are supported by opposite frame members 87, guide rolls 88 also being carried by the members 87 to guide the belt 84 at its lower pass. The belt 84 may be separately driven by means (not shown) and is preferably driven at a surface speed substantially equal to the peripheral speed of the rotating frame.

In view of the fact that the material carried upon bridge 83 is not carried by a movable support. It must be pushed across said bridge. To facilitate this operation, the bridge 83 carries side walls 89 and a top 90 whereby the material discharged to the bridge is pushed through a confined passageway 91 to the upper pass of belt 84

Figure 3:
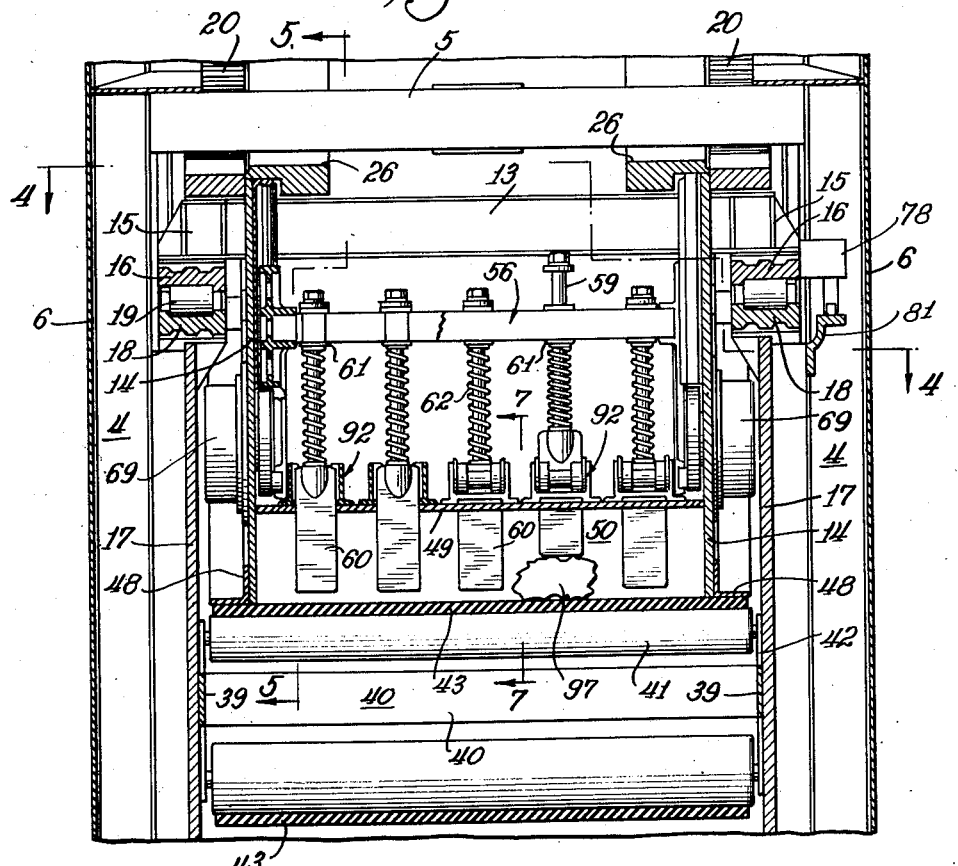
Fig. 3 is an enlarged sectional view taken on line 3—3 of Fig. 1.

To facilitate the reciprocating movement of the blades 60 a bracket 92, Figs. 3, 7 and 8, is mounted upon the inner face of the drum surface 49 adjacent the position where said blades protrude through said surface. Each bracket 92 carries a pair of rotatable rollers 93 which bear against opposite side portions of a blade 60. The rollers 93 are positioned on that side of each blade which might be termed, the trailing side, that is, the rollers provide an abutment for the blades against the reaction of the material which they encounter in the space 50. Thus, the load of pushing the material is relieved to a degree at those ends of the shanks 59 which extend through plates 58 and 61.

In order to prevent the material conveyed from passing through apertures 94 at the uppermost position of travel of the rotating frame, combination sealing and scraper members 95 extend partially across the apertures 94 and bear upon opposite sides of each blade 60. The members 95 are slidably movable upon brackets 92 and are pressed by springs 96 toward said blade surfaces. The members 95, in addition to functioning as sealing members also serve as scrapers, in the event the material conveyed is wet or adherent.

In the event that the material conveyed and elevated carries relatively large, hard lumps, such as illustrated at 97 in Fig. 3, such lumps may be disposed in alignment with one or more blades 60 as they are moved radially outwardly. If such lumps are encountered by one or more blades, although the bars 57 may move radially outwardly the obstructed blade or blades will move only a distance determined by the strength of spring 62 at which time the spring will be compressed thus taking up the lost motion of the blade relative to bars 57.

Of course, if packed material is to be elevated which may be injured by the radially moving blades, such packages may be indexed before or during their transfer from belt 34 to belt 43.

If coarse lumpy material is to be elevated the blades 60 instead of being flat, as illustrated, may comprise bar-like members which, if desired, may be pointed whereby they will more readily penetrate the coarse, lumpy mass. Accordingly, where reference is made to blades 60 in the specification and claims hereof, such bar-like members or other suitable projecting, baffling or partitioning means is contemplated.

I claim as my invention:

1. An elevator-conveyor comprising a relatively stationary frame, a relatively rotatable frame mounted upon said stationary frame, means upon said stationary frame for rotating said rotatable frame in a substantially vertical plane, an arcuate drum plate carried upon said rotatable frame adjacent the periphery thereof, a movable member carried upon the periphery of said rotatable frame for a portion of its travel in radial spaced relationship with respect to said drum plate to provide an arcuate space for the reception of material to be elevated, said movable member traversing a major portion of the upward travel of said rotatable frame, and radially movable means carried by said rotating frame for movement through apertures provided in said drum plate into and out of said space for substantially partitioning said space.

2. An elevator-conveyor comprising a relatively stationary frame, a relatively rotatable frame mounted upon said stationary frame, means upon said stationary frame for rotating said rotatable frame in a substantially vertical plane, an arcuate drum plate carried upon said rotatable frame and spaced radially inwardly from the periphery thereof, an endless flexible member wrapped around a portion of the rotatable frame in outward radial spaced relationship with respect to said drum plate to define with said drum plate an arcuate space for the reception of material to be elevated, said endless flexible member traversing a major portion of the upward travel of said rotatable frame, and radially movable means carried by said rotating frame for radial movement through apertures provided in said drum plate into and out of said space for substantially partitioning said space.

3. An elevator-conveyor comprising a relatively stationary frame, a relatively rotatable frame mounted upon said stationary frame, means upon said stationary frame for rotating said rotatable frame in a substantially vertical plane, an arcuate drum plate carried upon said rotatable frame adjacent and radially spaced inwardly from the periphery thereof, an endless flexible member carried by said rotatable frame for a portion of its travel in radial spaced relationship with respect to said drum plate to provide an arcuate space for the reception of material to be elevated, said endless flexible member traversing a major portion of the upward travel of said rotatable frame, and radially movable means carried by said rotating frame in circumferentially spaced relationship to each other for radial movement through circumferentially spaced apertures in said drum plate into and out of said space for substantially partitioning said space.

4. An elevator-conveyor comprising a relatively stationary frame, a relatively rotatable frame mounted upon said stationary frame, means upon said stationary frame for rotating said rotatable frame in a substantially vertical plane, an arcuate drum plate mounted upon said rotatable frame adjacent the periphery thereof and radially spaced inwardly from said periphery, an endless flexible member carried by said rotatable frame for a portion of its travel in radial spaced relationship with respect to said drum plate to provide an arcuate space for the reception of material to be elevated, said endless flexible member traversing a major portion of the upward travel of said rotatable frame, radially movable means carried by said rotating frame in circumferentially spaced relationship to each other for radial movement through circumferentially spaced apertures provided in said drum plate into and out of said space for substantially partitioning said space, and means carried by said rotatable frame for radially moving said radially movable means.

5. An elevator-conveyor comprising a relatively stationary frame, a relatively rotatable frame mounted upon said stationary frame, means upon said stationary frame for rotating said rotatable frame in a substantially vertical plane, an arcuate drum plate carried upon said rotatable frame adjacent the periphery thereof, an endless flexible member carried by said rotatable frame for a portion of its travel in outward radial spaced relationship with respect to said drum plate to provide an arcuate space for the reception of material to be elevated, said endless flexible member traversing a major portion of the upward travel of said rotatable frame, radially movable means carried by said rotating frame in circumferentially spaced relationship to each other for radial movement through apertures provided in said drum plate into and out of said space for substantially partitioning said space, a plurality of electric motors carried by said rotatable frame, and means connecting each of said radially movable means to a motor whereby said means is moved radially.

6. An elevator-conveyor comprising a relatively stationary frame, a relatively rotatable frame mounted upon said stationary frame, means upon said stationary frame for rotating said rotatable frame in a substantially vertical plane, an arcuate drum plate carried upon said rotatable frame and radially spaced inwardly from the periphery thereof, a movable member carried by said rotatable frame for a portion of its travel in outward radial spaced relationship with respect to said drum plate to provide an arcuate space for the reception of material to be elevated, said movable member traversing a major portion of the upward travel of said rotatable frame, and radially movable means carried by said rotating frame, said radially movable means comprising a relatively flat blade, and means carried by said rotatable frame for radially moving said blade through an aperture provided in said drum plate into and out of said space to substantially partition said space and substantially inhibit arcuate movement of the material through said space.

7. An elevator-conveyor comprising a relatively stationary frame, a relatively rotatable frame mounted upon said stationary frame, means upon said stationary frame for rotating said rotatable frame in a substantially vertical plane, an arcuate drum plate carried upon said rotatable frame adjacent the periphery thereof, a movable member carried by said rotatable frame for a portion of its travel in outward radial spaced relationship with respect to said drum plate to provide an arcuate space for the reception of material to be elevated, said movable member traversing a major portion of the upward travel of said rotatable frame, and radially movable means carried by said rotating frame, said radially movable means comprising a plurality of relatively flat blades, and means carried by said rotatable frame for radially moving said blades through apertures provided in said drum plate into and out of said space to substantially partition said space and substantially inhibit arcuate movement of the material through said space.

8. An elevator-conveyor comprising a relatively stationary frame, a relatively rotatable frame mounted upon said stationary frame, means upon said stationary frame for rotating said rotatable frame in a substantially vertical plane, an arcuate drum plate mounted upon said rotatable frame and radially spaced inwardly from the periphery thereof, a movable member carried by said rotatable frame for a portion of its travel in outward radial spaced relationship with respect to said drum plate to provide an arcuate space for the reception of material to be elevated, said movable member traversing a major portion of the upward travel of said rotatable frame, and radially movable means carried by said rotating frame, said radially movable means comprising a plurality of circumferentially spaced pairs of guides carried by said rotatable frame, blade means including blades reciprocally movable in each pair of guides in a radial direction relative to said space, and means carried by said rotatable frame for moving said blade means in said guides to move the blades carried thereby through apertures provided in said drum plate and into and out of said space to substantially partition said space and substantially inhibit arcuate movement of the material through said space.

9. An elevator-conveyor comprising a relatively stationary frame, a relatively rotatable frame mounted upon said stationary frame, means upon said stationary frame for rotating said rotatable frame in a substantially vertical plane, an arcuate drum plate carried upon said rotatable frame adjacent the periphery thereof, a movable member carried by said rotatable frame for a portion of its travel in radial spaced relationship with respect to said drum plate to provide an arcuate space for the reception of material to be elevated, said movable member traversing a major portion of the upward travel of said rotatable frame, and radially movable means carried by said rotating frame, said radially movable means comprising a plurality of circumferentially spaced pairs of guides carried by said rotatable frame, support means reciprocally movable in each pair of guides in a radial direction relative to said space, a plurality of blades carried by said support means for radial movement through apertures provided in said drum plate into and out of said space when said support means moves in said guides, and means carried by said rotatable frame for moving said support means in said guides whereby said blades move into said space to substantially partition said space and substantially inhibit arcuate movement of the material through said space.

10. An elevator-conveyor comprising a relatively stationary frame, a relatively rotatable frame mounted upon said stationary frame, means upon said stationary frame for rotating said rotatable frame in a substantially vertical plane, an arcuate drum plate mounted upon said rotatable frame and spaced radially inwardly from the periphery thereof, a movable member carried by said rotatable frame for a portion of its travel in outward radial spaced relationship with respect to said drum plate to provide an arcuate space for the reception of material to be elevated, said movable member traversing a major portion of the upward travel of said rotatable frame, and radially movable means carried by said rotating frame, said radially movable means comprising a plurality of circumferentially spaced pairs of guides carried by said rotatable frame, support means reciprocally movable in each pair of guides in a radial direction relative to said space, a plurality of blades resiliently carried by said support means for radial movement through apertures provided in said drum plate into and out of said space when said support means moves in said guides, and means carried by said rotatable frame for moving said support means in said guides whereby said blades move into said space to substantially partition said space and inhibit arcuate movement of the material through said space.

References Cited in the file of this patent
UNITED STATES PATENTS
579,451    Richards _____ Mar. 23, 1897